(12) United States Patent
Benthien et al.

(10) Patent No.: US 11,060,545 B2
(45) Date of Patent: Jul. 13, 2021

(54) FASTENING SYSTEM FOR SECURING COMPONENTS

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 194 days.

(21) Appl. No.: 16/286,008

(22) Filed: Feb. 26, 2019

(65) Prior Publication Data

US 2019/0264724 A1   Aug. 29, 2019

(30) Foreign Application Priority Data

Feb. 27, 2018   (DE) .......................... 102018104360.0

(51) Int. Cl.
*F16B 21/18*   (2006.01)
*F16D 1/116*   (2006.01)

(52) U.S. Cl.
CPC ............ *F16B 21/186* (2013.01); *F16D 1/116* (2013.01)

(58) Field of Classification Search
CPC .... F16B 21/186; F16B 21/16; F16B 37/0857; F16D 1/116
USPC ........ 411/270, 266, 278, 529, 512, 433, 437
See application file for complete search history.

(56) References Cited

U.S. PATENT DOCUMENTS

| 750,675 | A | * | 1/1904 | Michelin | ................. | F16B 37/00 411/432 |
| 1,476,491 | A | * | 12/1923 | Coles | ..................... | F16B 21/16 411/500 |
| 2,111,267 | A | * | 3/1938 | Hoppenstand | .......... | F16B 21/06 411/338 |
| 4,394,097 | A | * | 7/1983 | Horlacher | ............... | F16B 21/16 403/360 |
| 4,659,273 | A | * | 4/1987 | Dudley | ................. | F16B 41/005 411/373 |
| 4,850,778 | A | * | 7/1989 | Clough | ............... | F16B 37/0842 411/433 |
| 5,197,840 | A | * | 3/1993 | Peek | ..................... | F16B 5/0233 411/433 |

(Continued)

FOREIGN PATENT DOCUMENTS

DE   102005054890 A1   5/2007
DE   102006016509 A1   10/2007

*Primary Examiner* — Flemming Saether
(74) *Attorney, Agent, or Firm* — Nixon & Vanderhye P.C.

(57) ABSTRACT

A fastening system for securing a component includes a first securing element having an engagement end and external toothing, a second securing element having elastic clamp members arranged about a common axis and having internal toothing facing the axis, and a fixing member. The clamps members assume a radial position relative to the axis that is variable due to their elasticity. The clamps are designed such that the second securing element can be pushed onto the engagement end such that the teeth of the engagement end and the clamps snap into each other. The clamps move from a first radial position to an external second radial position to engage or disengage a snapped-in state when shifting the external toothing and the first internal toothing to each other.

13 Claims, 6 Drawing Sheets

(56) References Cited

U.S. PATENT DOCUMENTS

| | | | |
|---|---|---|---|
| 7,179,038 B2 * | 2/2007 | Reindl | F16B 37/0864 |
| | | | 411/188 |
| 7,981,143 B2 * | 7/2011 | Doubler | F16B 37/0864 |
| | | | 606/300 |
| 8,328,488 B2 * | 12/2012 | Luk | F16L 3/223 |
| | | | 411/433 |

* cited by examiner

FASTENING SYSTEM FOR SECURING COMPONENTS

CROSS-REFERENCE TO PRIORITY APPLICATION

This application claims the benefit of, and priority to, German patent application number DE 102018104360.0, filed on Feb. 27, 2018. The content of the referenced application is incorporated by reference herein.

TECHNICAL FIELD

Embodiments of the subject matter described herein relate generally to a fastening system for fastening or securing components, in particular in a vehicle. The embodiments of the invention also relate to a vehicle, and in particular an aircraft, which has an interior space with an installation component arranged therein, which is fastened or secured with such a fastening system.

BACKGROUND

In means of transport, such as passenger aircraft, there are usually many installations. These can be fastened by means of bolts, pins or similar securing elements. Counter elements, such as nuts or split pins, can secure the securing elements in their fastening position.

Patent publication DE 10 2006 016 509 A1 shows, for example, a quickly detachable fastening system for an attachment element to a fastening structure in an aircraft in which several securing elements are used for fastening or fixing. A similar system is shown in patent publication DE 10 2005 054 890 A1, which is aimed at a fixing structure for fixing interior components of an aircraft passenger cabin.

BRIEF SUMMARY

Accordingly, it may be regarded an object of the disclosure to propose a fastening system for securing a component which can be used quickly and safely and which supports in particular the facilitation and acceleration of the assembly of components.

The object is met by a fastening system with the features of the independent claim 1. Advantageous embodiments and further improvements may be gathered from the subclaims and the following description.

A fastening system for securing a component is proposed, the fastening system comprising a first securing element with an engagement end having a first external toothing, a second securing element having a plurality of elastic clamp members, which are uniformly arranged about a common axis and have a first internal toothing on inner sides facing the common axis, a fixing element with a recess, wherein the clamp members can at least in a region assume a radial position relative to the common axis which is variable due to their elasticity, wherein the clamp members are designed such that the second securing element is pushable onto the engagement end and, when pushed on, the first external toothing of the engagement end and the first internal toothing of the clamp members snap into each other, wherein the clamp members for engaging or releasing a snapped-in state during displacement of the first external toothing and the first internal toothing relative to each other move away from a first radial position to an external second radial position at least in a region, and wherein the recess of the fixing element is dimensioned such that the fixing element is pushable onto the second securing element and the clamp members are held in the first radial position.

The fastening system according to the disclosure therefore has three components that work together to secure a component. The first securing element may be realized in the form of any connecting element that is capable of connecting a component to another component. As an example, the first securing element is an elongated body that can be inserted through a hole in a component to be secured. It is conceivable that the component has a bore that is aligned with another bore. The first securing element may be inserted through both holes aligned with each other and then fixed by the second securing element. An end of the first securing element facing away from the engagement end may have a shoulder or the like preventing the first securing element from slipping through a hole. The engagement end is secured after the first securing element has been inserted using the second securing element and the fixing element.

Of course, all other types of first securing elements are conceivable which in some way have an engagement end to which a second securing element and a fixing element can be attached to secure the first securing element.

The engagement end may be an elongated section of the first securing element which, in particular, has a constant cross-section. The engagement end is provided with the first external toothing, which is designed in particular as a radial toothing. Radial toothing is an arrangement of recesses, grooves or similar shape features which surround the engagement end in the circumferential direction. In particular, several of these shape features are arranged at a distance from each other. The external toothing may therefore be interpreted as an external thread. However, it does not necessarily comprise a thread pitch.

The second securing element has several elastic clamp members. The clamp members are equipped with a first internal toothing on their inner sides. In particular, the clamp members are to be understood as components which extend parallel or largely parallel to the axis of the second securing element and which are lined up around the axis in the circumferential direction. There may be a certain distance between the individual clamp members. The number of clamp members is substantially not significant and may be dimensioned according to the choice of material and the size of the engagement end.

The clamp members are elastic, in particular spring-elastic. In this sense, a certain movability of the clamp members in a direction transverse to the axis of the second securing element, i.e. in radial direction, is to be understood. In a general variant, it is irrelevant whether the clamp members can be moved in this direction as a whole or only partially.

The first internal toothing on the inside of the clamp members is matched to the first external toothing of the engagement end. The first internal toothing can therefore engage with the first external toothing. Since, as mentioned above, the first external toothing is designed as a sequence of grooves, recesses or the like, the first internal toothing is also designed as a sequence of grooves or recesses between which there are protrusions or elevations. The protrusions or elevations of the internal toothing therefore come into surface contact with the grooves or recesses of the external toothing and vice versa.

The general shape of the assembly of clamp members preferably forms a circular shape in a plane perpendicular to the axis of the second securing element. This allows the second securing element to be pushed onto the engagement end when the engagement end is correspondingly shaped.

Due to the arrangement of first internal toothing and first external toothing, when the second securing element is pushed on, a positive fit can be produced between the second securing element and the engagement end. When the second securing element is pushed on, the clamp members thus snap with their first internal toothing onto the first external toothing of the engagement end.

It is preferable that the clamp members are designed to be elastic so that they push into a radial position in which a positive fit is produced between the first internal tooting and the first external toothing. Conversely, this means that when the second securing element is pushed onto the engagement end, when the first internal toothing and the first external toothing slide against each other, the clamp members have to make evasive movements in order to be able to snap the toothings into each other. When sliding on, the clamp members expand and spring back successively, depending on the number of grooves or recesses, until a desired snapped-in position of the second securing element is achieved. In the latter, the clamp members grip the engagement end in a plier-like manner and are held in position by the positive fit of the toothings.

In the following, the outermost radial position into which the clamp members are moved is referred to as the "second radial position". The inner radial position of the clamp members at rest or in a snapped-in state is referred to as the "first radial position". Consequently, a connection between the first securing element and the second securing element can only be made if the clamp members can move freely between the first radial position and the second radial position. For the final fixation of the connection between the two securing elements, the fixing element is used whose recess is adapted to the first radial position. The recess is preferably dimensioned in such a way that the fixing element can easily be pushed onto the second securing element when the clamp members are in the first radial position. For example, a positive fit or surface contact can be achieved between an outer circumferential surface of the clamp members and an inner circumferential surface of the recess of the fixing element. This prevents the clamp members from moving to the second radial position. As a result, the connection between the external toothing and the first internal toothing cannot be loosened non-destructively when the fixing element is attached.

The type and design of the toothing can be designed as required. It is advisable to design a toothing similar to that of cable ties. The individual grooves can be symmetrical or inclined on one side in a profile cross-section, which allows the second securing element to be pushed on particularly easily.

The connection between the two securing elements can therefore be achieved very quickly and easily by placing the first securing element on a component to be secured, then sliding the second securing element onto the engagement end and then placing the fixing element on the second securing element.

In a preferred embodiment, the first securing element is an elongated body with a head end opposite the engagement end with at least one radial projection. The radial projection is to be understood as a region running transversely to a longitudinal axis of the first securing element. It is designed to prevent the first securing element from slipping through a hole. When the second securing element is attached, the first securing element is held in the corresponding hole between the head end and the engagement end.

In an advantageous embodiment, the second securing element is of an annular or bush-shaped design and has a first end and a second end, wherein adjacent clamp members are separated from one another by an axial gap which runs parallel to the common axis, at least in an axial partial section. Due to the circumferential separation of the clamp members by an axial gap, the clamp members are designed similar to fingers, which are freely movable in radial direction at least at the first end. Due to their elastic design, the clamp members can act as springs that always urge into the first radial position when they are moved outwards to a second radial position during the snap-in process.

Particularly preferably the clamp members at the second end are not separated from each other in the circumferential direction in particular. Thus, the second end forms a basis for the clamp members. This can be, for example, a closed ring from which the clamp members extend to the first end.

The first internal toothing extends advantageously on an axial section facing away from the second end. If radial movement of the clamp members is excluded at the second end, a first internal toothing arranged there cannot engage with the first external toothing without a certain compressibility of the engagement end. It is therefore advisable to fit the internal toothing only where a certain elasticity of the second securing element is guaranteed.

In a particularly preferred embodiment, the fixing element is of an annular or bush-shaped design and has a first fixing end and a second fixing end which are arranged opposite to each other along a fixing element axis, wherein the clamp members have a second external toothing on their outer side at least in a region, and wherein bent, elastic claws are arranged on at least one of the first fixing end and the second fixing end and extend at least in a region obliquely or transversely to the fixing element axis, so that they engage with the second external toothing when the fixing element is pushed onto the second securing element. The fixing element is therefore equipped with simple, but very efficient means to achieve a shift protection on the second securing element. The fixing element can therefore be pushed onto the second securing element, whereby the elastic claws ensure that it snaps into the second external toothing of the clamp members. The fixing element can then no longer be released automatically from the second securing element, so that the second securing element is secured accordingly. The claws are positioned transverse or oblique to the axis of the fixing element so that they point towards the axis of the fixing element, i.e. do not run parallel to it. It is reasonable to dimension the elastic claws in such a way that when the fixing element is pushed onto the second securing element, the corresponding claws automatically snap into the second external toothing. The claws may have a slightly smaller distance from the fixing element axis than the boundary walls of the interior of the fixing element.

It is particularly advantageous if the fixing element has elastic claws at both the first fixing end and the second fixing end. The fixing element can be secured on both sides against unintentional loosening. On the other hand, by pushing the fixing element onto the second securing element, a slight compression of the side of the fixing element facing the first securing element can be achieved, for example by means of a bearing surface of a component to be secured. This allows the fixing element to build up a certain tension in an axial direction. A snapping of the claws into the second external toothing can be supported by the tension if the toothings are designed accordingly.

The elastic claws of the first fixing end can be more inclined to the fixing element axis than the elastic claws of the second fixing end in an advantageous embodiment. This supports the sliding of the fixing element up to the component to be secured, in the region of which the engaging end of the first securing element protrudes. The claws on the first fixing end can get into surface contact with a component to be secured when the fixing element is pushed on, so that the elastic claws may be pressed into an orientation that is essentially transverse to the axis of the fixing element. If the claws are already aligned approximately in a direction transverse to the axis of the fixing element, it is very easy to slide them completely onto the second securing element.

In an advantageous embodiment, the second securing element and the fixing element comprise at least one guide element for guiding the fixing element on the second securing element in a torsion-resistant manner. The fixing element can therefore be applied to the second securing element, wherein the guide element or elements determine the direction of movement of the fixing element. A precise alignment, in particular of the claws on the second external toothing of the clamp members, is thus achieved. The guide element can in particular be designed as a tongue and groove. It is conceivable that the groove has a funnel-shaped lead-in area which greatly simplifies the alignment of the fixing element to the second securing element. Overall, the high reliability and safety of the fastening system can be supported by the guide element.

In a preferred embodiment, the guide element is formed as at least one tongue on an inner side of the fixing element which is adapted to be guided into an axial gap between two adjacent clamp members. Since one or more axial gaps may already be present in one of the designs described above, the integration of a guide element is very simple and straightforward.

Preferably, the axial extension of the fixing element is smaller than the axial extension of the second securing element. The fixing element is therefore a kind of ring that is pushed onto a somewhat more elongated, sleeve-shaped implementation of a second securing element. This supports in particular the implementation of the second securing element, which is equipped with clamp members separated from each other in a region by an axial gap. The fixing element can be attached to or inserted into a second end of the second securing element and then moved towards the first end of the second securing element, where the clamp members are radially movable.

The second securing element is particularly preferred designed in one piece. This also applies to the fixing element. Both elements may still be made of a plastic material. An injection molding process is particularly suitable for manufacturing the second securing element and/or the fixing element. The manufacturing costs are therefore very low and allow a wide range of applications, even in different sizes.

The disclosure also relates to a vehicle comprising an interior space having a component arranged therein, the component being secured in a structurally fixed manner by means of a fastening system as described above.

The vehicle may be designed as an aircraft. The fastening system shown above allows a vibration-proof securing of a component with a very low weight and low assembly effort.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure result from the following description of the exemplary embodiments and figures. All described and/or illustrated features in themselves and in any combination form the subject matter of the disclosure, irrespective of their composition in the individual claims or their references. Furthermore, the same reference numerals in the figures refer to the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
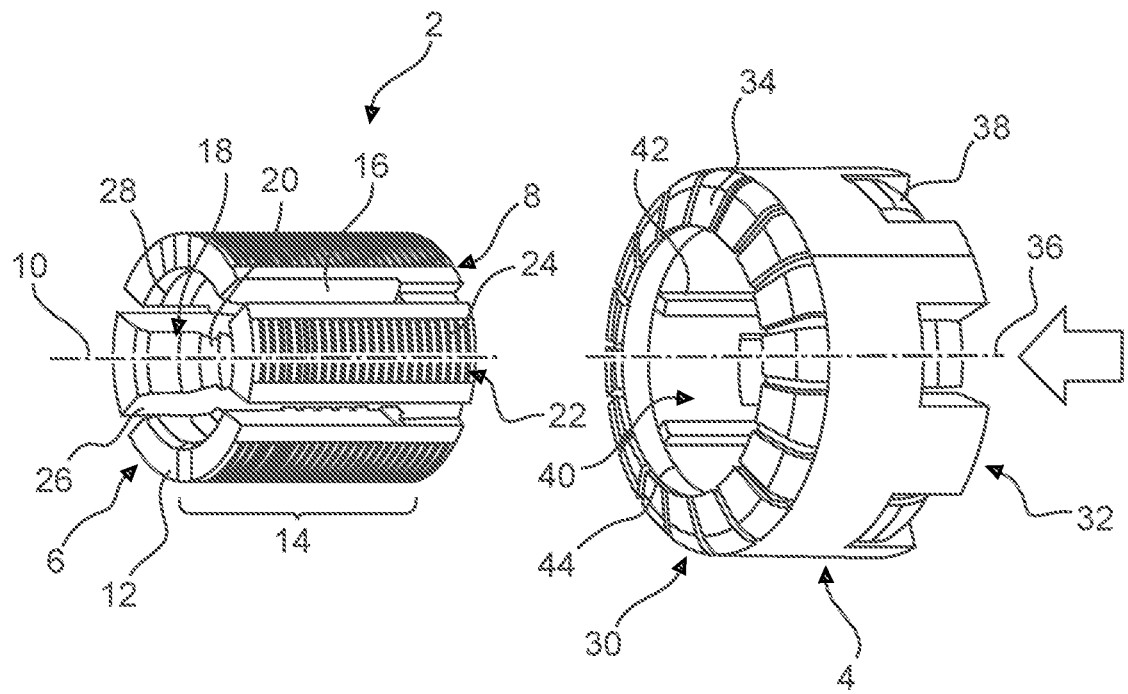
FIGS. 1a and 1b show a second securing element and a fixing element in a three-dimensional view before assembly (1a) and in a partially assembled state (1b).

FIG. 1a shows a three-dimensional illustration of a second securing element 2 and a fixing element 4 which are about to be pushed together or into each other. The two components are explained in detail below.

The second securing element 2 has a first end 6, a second end 8 and a longitudinal axis 10. Around the longitudinal axis 10 there are several clamp members 12 arranged, which run parallel to the longitudinal axis 10 and are separated from each other by a gap 16 in a front axial section 14, which adjoins the first end 6. The clamp members 12 have a first internal toothing 20 on their inner sides 18 facing the longitudinal axis 10.

Further, an external toothing 24, hereinafter referred to as the "second" external toothing 24, is arranged on the outer sides 22 of the clamp members 12. The second securing element 2 is made of a plastic material and has a certain elasticity as a result. In particular, the use of a polyamide, such as PA66, as a material may be a suitable option. This material is already qualified for a variety of similar applications. Furthermore, this material can be injection molded at low cost without further ado.

Altogether, the second securing element 2 has a cylindrical outer shape which encloses a cavity 26 and has a chamfer 28 on the inner side 18 for placing on a first securing element shown later. This achieves a certain funnel function.

The fixing element 4 has a ring shape and has a first fixing end 30 and a second fixing end 32. On the first fixing end 30 there is a row of elastic claws 34, which run diagonally to a fixing element axis 36. At the second fixing end 32 also elastic claws 38 are arranged, which however are less inclined relative to fixing element axis 36.

A recess 40 is dimensioned in such a way that the fixing element 4 can be pushed onto the second securing element 2. The claws 34 and 38 engage with the second external toothing 24. In addition, guide webs 42 are visible as guide elements which can form a sliding connection with the axial gaps 16 so that the fixing element 4 and the second securing element 2 can slide along each other. Here a relative position to each other is maintained.

The recess 40 is provided with a chamfer 44 in the region of the first fixing end 30. This can function as a kind of insertion funnel, so that concentric alignment of the recess 40 and the second securing element 2 can easily be achieved.

Figure 1B:
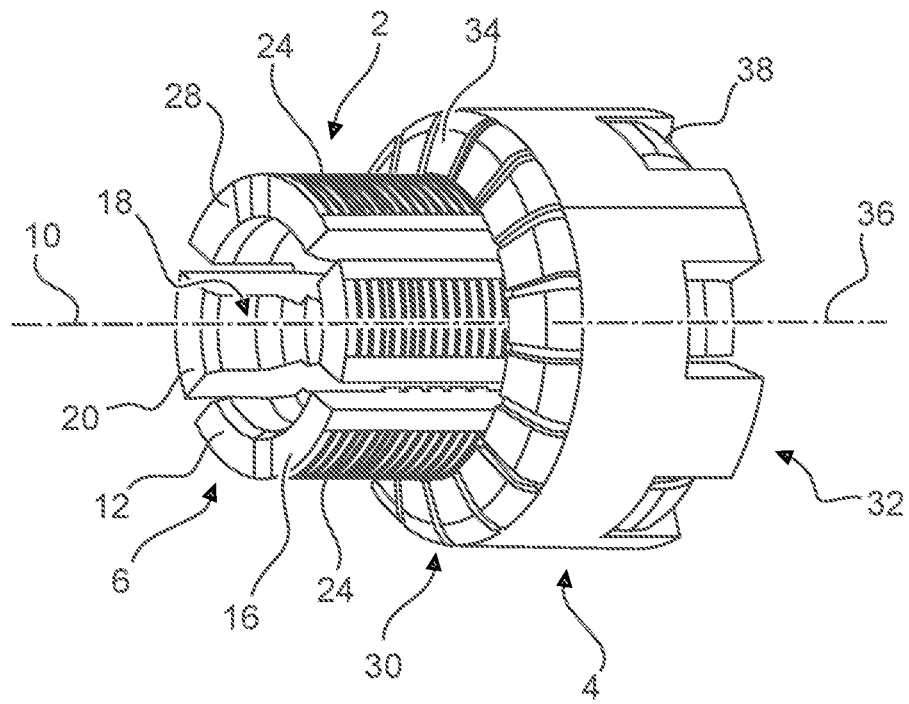

In FIG. 1b the fixing element 4 is already partially pushed onto the second securing element 2. The claws 34 of the first fixing end 30 engage with the second external toothing 24. This means that the claws 34 get caught in gaps between teeth of the second external toothing 24. The second securing element 2 and the fixing element 4 can be supplied prefabricated in the position shown in FIG. 1b to further simplify their use.

Figure 2A:
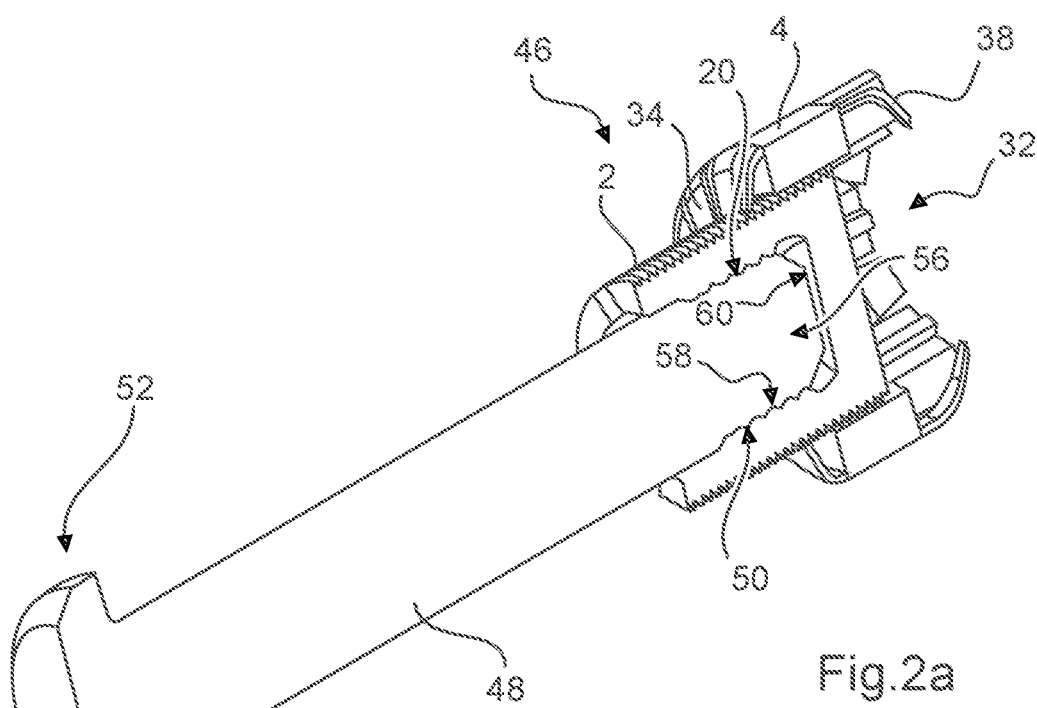
FIGS. 2a, 2b and 2c show a first securing element equipped with a second securing element with a partially mounted fixing element (2a), in a fully assembled state (2b) and in a partial section (2c).

FIG. 2a now shows a complete fastening system 46, which has, in addition to the second securing element 2 and the fixing element 4, also a first securing element 48. This is designed as an elongated body having an engagement end 50 and a head end 52 opposite the engagement end 50 at which a radial projection 54 is present.

The second securing element 2 is pushed onto an engagement end 56, which has a first external toothing 58. In the illustration shown, this comes into contact with the first internal toothing 20. The second securing element 2 here is almost completely pushed onto the engagement end 56, so that it is almost in surface contact with a bottom surface 60 inside the second securing element 2. The fixing element 4 in the illustration is about to be pushed onto the second securing element 2.

Figure 2B:
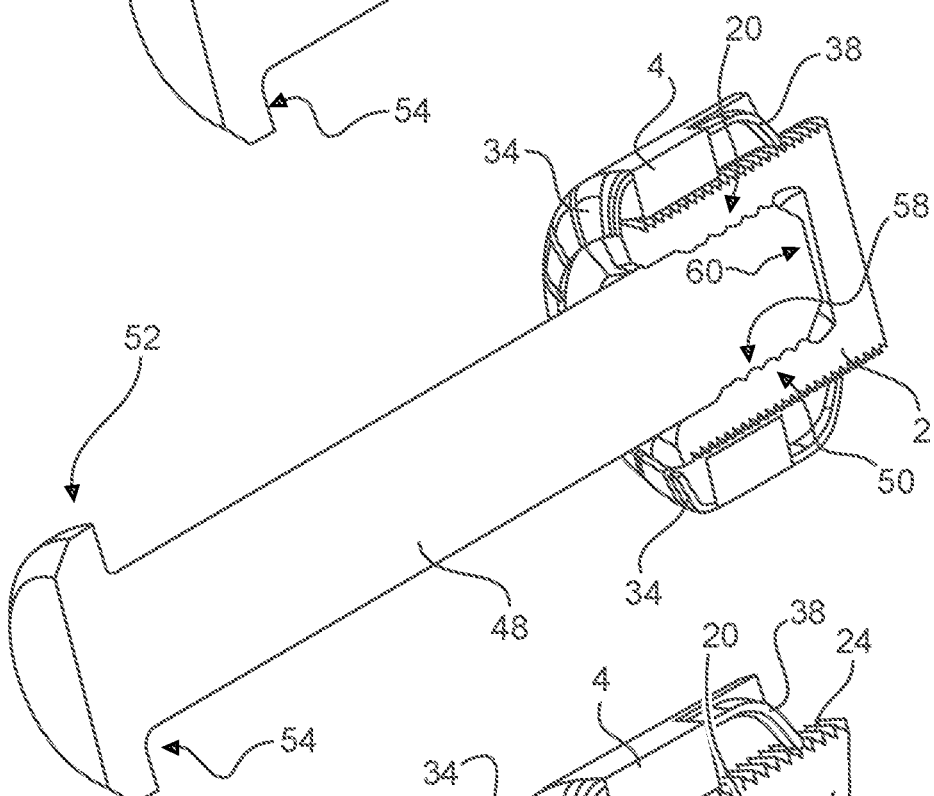

This is the case in FIG. 2b. Here the fixing element 4 is practically completely pushed onto the second securing element 2. The claws 34 and 38 are each separately clamped with the second external toothing 24 of the second securing element 2. The fastening procedure is further described in the following FIGS. 3a to 3e.

Figure 2C:
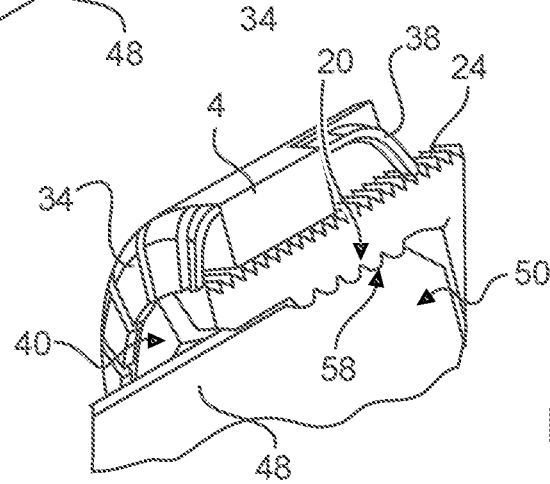

FIG. 2c shows a detailed section of the fixing element 4, the second securing element 2 and the first securing element 48. As an example, the first internal toothing 20 has a rounded toothing profile. The second external toothing also has a toothing profile as an example, which is slightly inclined to the first end 6.

Figure 3A:
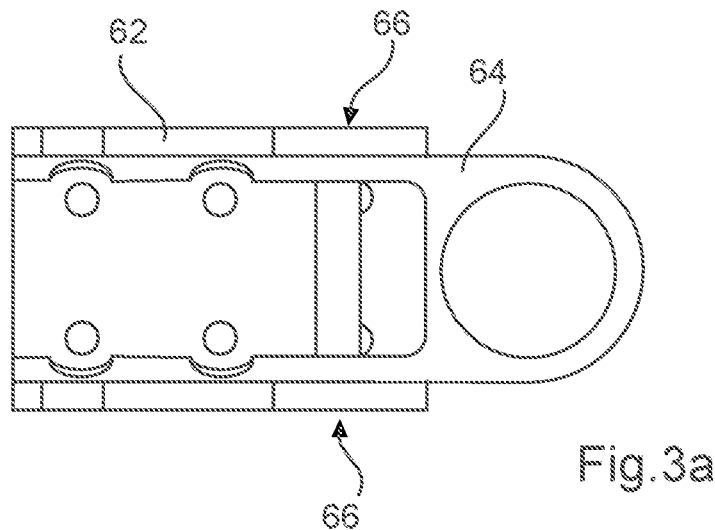
FIGS. 3a to 3e show the process of fastening or securing a component in several consecutive steps.

FIG. 3a shows an example of a first component 62 and a second component 64 which are to be connected to each other. For this purpose, both components 62 and 64 have holes 66 (not visible here) through which the first securing element 48 is inserted.

Figure 3B:
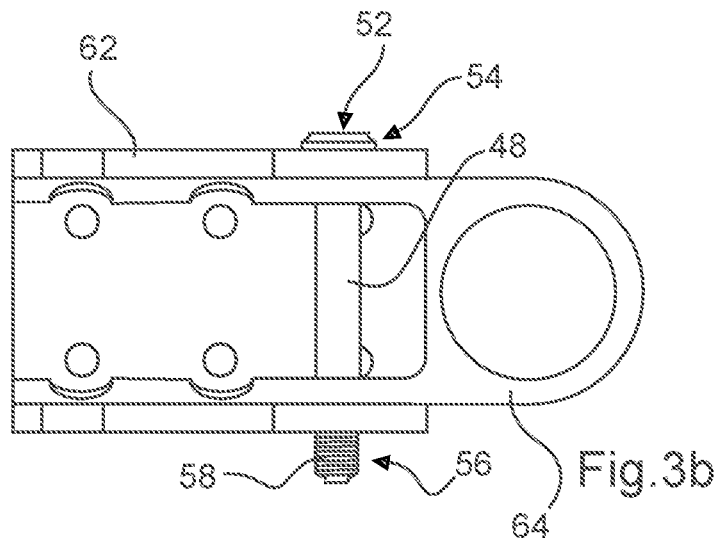

In FIG. 3b, the first securing element 48 is inserted through the holes 66 so that the engagement end 56 with the first external toothing 58 located on it projects beyond the component 62 and can be reached from the outside.

Figure 3C:
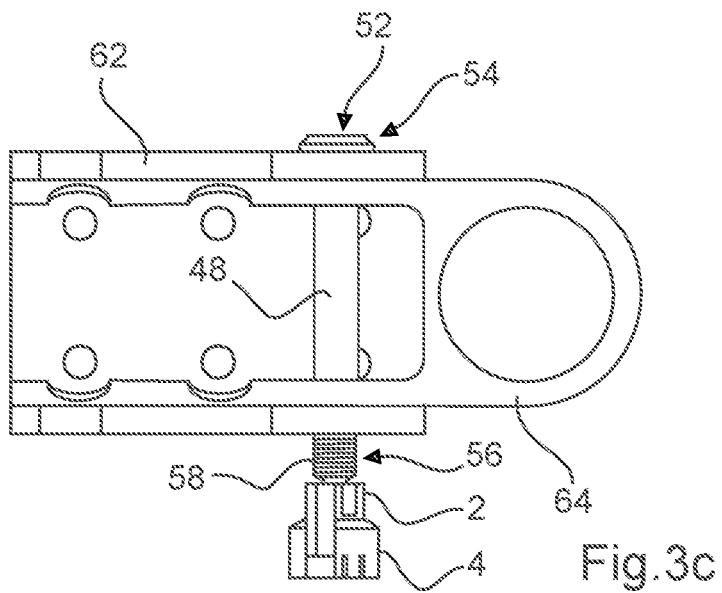
Figure 3D:
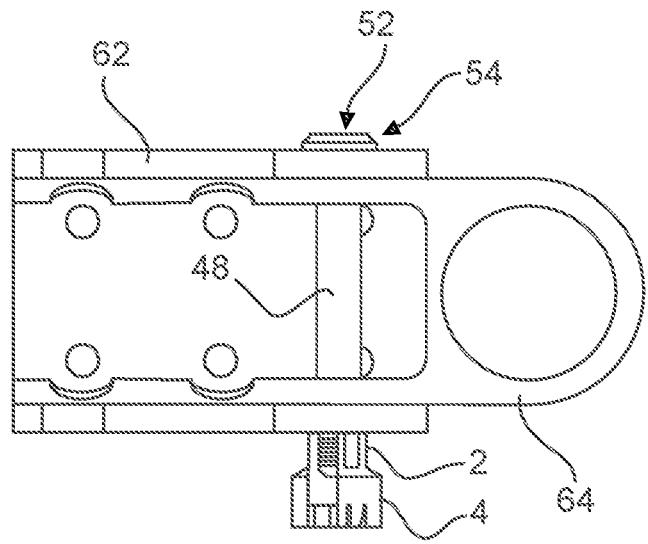

Then, as shown in FIG. 3c, the second securing element 2 with a partially pushed on fixing element 4 is brought into alignment with the engagement end 56 and pushed further onto the engagement end in FIG. 3d. The second securing element 2 is pushed up to an uppermost groove of the first external toothing 58. When sliding on, the clamp members 12 can move radially outwards over the grooves of the first external toothing 58 until the second securing element 2 is in a maximum sliding on position and there is engagement between the first external toothing 58 and the first internal toothing 20.

Figure 3E:
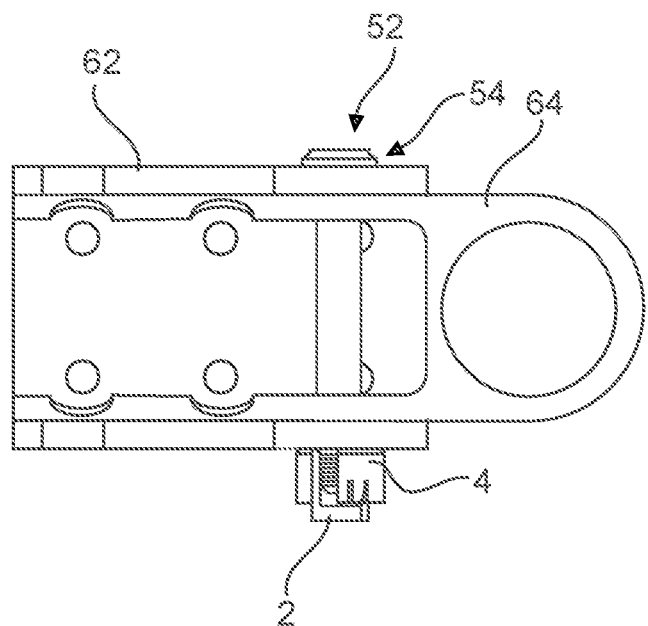

In FIG. 3e the fixing element 4 is completely pushed on so that the clamp members 12 are prevented from a further radial outward movement. It is no longer possible to release the second securing element 2 from the first securing element 48 with the fixing element 4 pushed on.

Figure 4A:
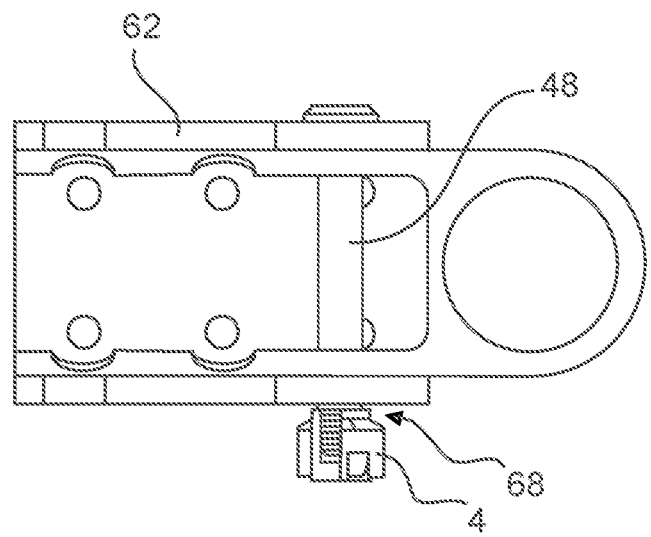
FIGS. 4a and 4b show two possible cases of error which are easily recognizable due to the type of the fastening system.
Figure 4B:
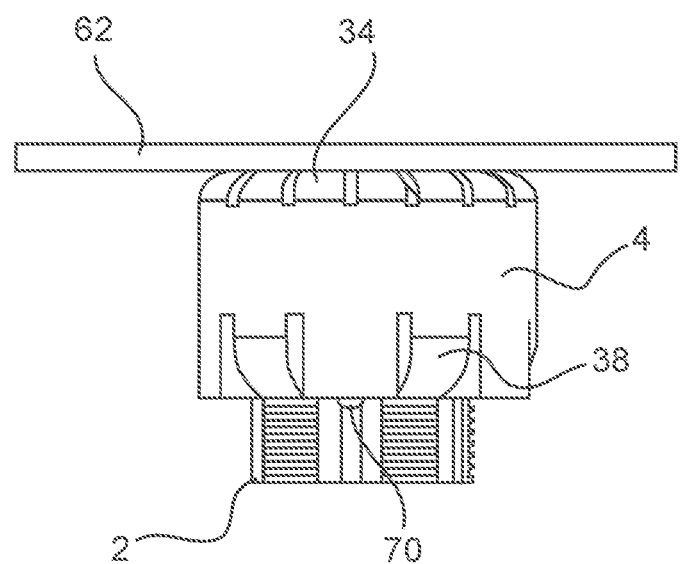

The second securing element 2 and the fixing element 4 can be designed to further support correct attachment by providing visual feedback to a user. FIGS. 4a and 4b show two examples of how such a visual feedback may look to cause a user to rework.

FIG. 4a shows, for example, that if the second securing element is not fully pushed on, there is a gap 68 to the component 62. This could be due to the fact that the first securing element 48 is too long so that it hits the bottom surface 60 shown in FIG. 2a, although the second securing element 2 has not yet been fully pushed on. Then, the first securing element 48 would have to be replaced for a suitable one. Before doing so, however, it should be tried to completely push on the second securing element 2 in order to fix it afterwards with the fixing element 4.

If, however, with a completely pushed-on second securing element 2 an opening 70 protruding into an axial gap 16 is visible, as can be seen in FIG. 4b, the length of the first securing element 48 may be changed. However, the second securing element 2 may also be pushed on not completely. However, due to the function of fixing using the fixing element 4, a reliable securing is also achieved in the examples shown. A rework, however, could reduce a tendency for the first securing element 46 to rattle.

Figure 5:
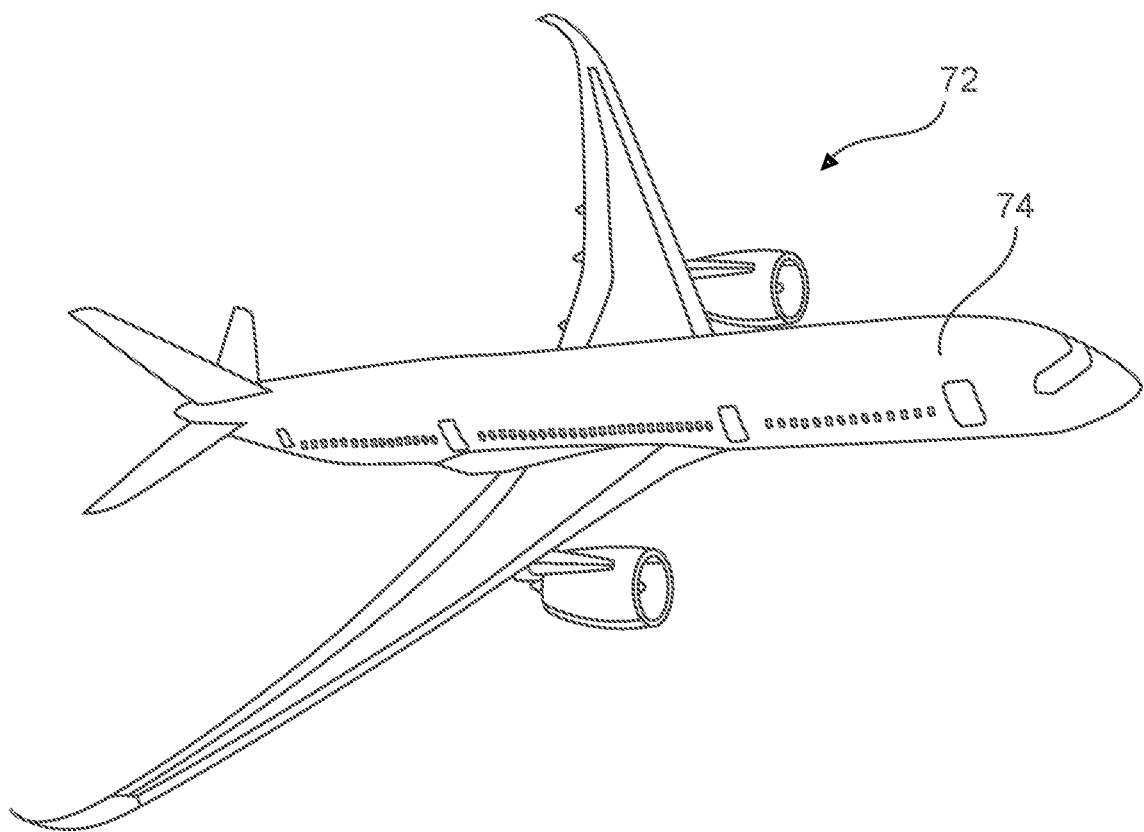
FIG. 5 shows an aircraft equipped with at least one component fastened by the fastening system in accordance with the disclosure.

Finally, FIG. 5 shows an aircraft 72 having an interior space 74 with a component arranged therein, wherein the component is structurally secured with the aid of a fastening system 46 as described above.

In addition, it should be noted that "comprising" does not exclude any other elements or steps, and "a" or "an" does not exclude multiple elements. It should also be noted that features described with reference to one of the above exemplary embodiments may also be used in combination with other features of other exemplary embodiments described above. Reference signs in the claims shall not be regarded as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A fastening system for securing a component, the system comprising:
   a first securing element with an engagement end having a first external toothing;
   a second securing element having a plurality of elastic clamp members which are arranged uniformly about a common axis and have a first internal toothing on inner sides facing the common axis, wherein the clamp members have a second external toothing at least in a region of the second securing element;

a fixing element with a recess, wherein the fixing element has an annular or bush-shape, and the fixing element includes a first fixing end and a second fixing end opposite to the first fixing end along a fixing member axis; and bent elastic claws arranged on both of the first fixing end and the second fixing end, wherein the bent elastic claws extend at least in a region of the fixing element obliquely or transversely to the fixing element axis, and the bent elastic claws engage the second external toothing when the fixing element is pushed onto the second securing element;

wherein the clamp members are configured to assume a radial position which is variable due to an elasticity of the clamp members relative to the common axis;

wherein the clamp members are configured such that the second securing element is pushable onto the engagement end and, when pushed on, the first external toothing of the engagement end and the first internal toothing of the clamp members snap into each other;

wherein the clamp members for engaging or releasing a snapped-in state during displacement of the first external toothing and the first internal toothing relative to each other move away from a first radial position to an external second radial position at least in a region; and wherein the recess of the fixing element is dimensioned such that the fixing element is pushable onto the second securing element and the clamp members are held in the first radial position.

2. The fastening system according to claim 1, wherein the first securing element is an elongated body having a head end opposite the engagement end with at least one radial projection.

3. The fastening system according to claim 1, wherein:
the second securing element is of an annular or bush-shaped design and has a first end and a second end; and
adjacent clamp members are separated from one another by an axial gap which runs parallel to the common axis, at least in an axial partial section.

4. The fastening system according to claim 3, wherein the clamp members at the second end are not separated from each other in the circumferential direction.

5. The fastening system according to claim 3, wherein the first internal toothing extends on an axial partial section facing away from the second end.

6. The fastening system according to claim 1, wherein the elastic claws of the first fixing end are more inclined to the fixing element axis than the elastic claws of the second fixing end.

7. The fastening system according to claim 1, wherein the second securing element and the fixing element comprise at least one guide element for guiding the fixing element on the second securing element in a torsion-resistant manner.

8. The fastening system according to claim 7, wherein the guide member is formed as at least one tongue on an inside of the fixing member adapted to be guided into an axial gap between two adjacent clamp members.

9. The fastening system according to claim 1, wherein the axial extension of the fixing element is smaller than the axial extension of the second securing element.

10. The fastening system according to claim 1, wherein the second securing element and/or the fixing element is a one piece element.

11. The fastening system according to claim 1, wherein the second securing element and the fixing element are made of a plastic material.

12. A vehicle comprising an interior space having a component disposed therein, the component being secured in a structurally fixed manner by the fastening system according to claim 1.

13. The vehicle according to claim 12, wherein the vehicle is an aircraft.

* * * * *